(12) United States Patent
Faruque et al.

(10) Patent No.: US 11,845,392 B1
(45) Date of Patent: Dec. 19, 2023

(54) AIRBAG SURROUNDING SEATBACK OF VEHICLE SEAT

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/854,624

(22) Filed: Jun. 30, 2022

(51) Int. Cl.
*B60R 21/213* (2011.01)
*B60R 21/2338* (2011.01)

(52) U.S. Cl.
CPC ........ *B60R 21/213* (2013.01); *B60R 21/2338* (2013.01); *B60R 2021/23386* (2013.01)

(58) Field of Classification Search
CPC .............. B60R 21/213; B60R 21/2338; B60R 2021/23386
See application file for complete search history.

(56) References Cited

U.S. PATENT DOCUMENTS

| | | | |
|---|---|---|---|
| 6,123,355 A * | 9/2000 | Sutherland | B60R 21/232 280/736 |
| 6,457,740 B1 * | 10/2002 | Vaidyaraman | B60R 21/232 280/730.2 |
| 6,481,743 B1 | 11/2002 | Tobe et al. | |
| 6,485,049 B1 * | 11/2002 | Prottengeier | B60R 13/0206 280/751 |
| 6,502,854 B2 * | 1/2003 | Mueller | B60R 21/214 180/281 |
| 6,817,626 B2 * | 11/2004 | Boll | B60R 21/213 280/730.1 |
| 7,762,579 B2 * | 7/2010 | Garner | B60R 21/232 280/730.2 |
| 7,828,322 B2 * | 11/2010 | Breuninger | B60R 21/36 280/730.2 |
| 9,016,717 B1 * | 4/2015 | Clauser | B60R 21/2338 280/729 |
| 9,126,558 B2 * | 9/2015 | Kawamura | B60R 21/213 |
| 9,573,553 B2 * | 2/2017 | Ko | B60R 21/13 |
| 9,610,915 B2 * | 4/2017 | Specht | B60R 21/233 |
| 9,676,361 B2 * | 6/2017 | Smith | B60R 21/231 |
| 9,809,189 B2 * | 11/2017 | Grell | B60R 21/2334 |
| 10,315,609 B2 * | 6/2019 | Thomas | B60R 21/261 |
| 10,640,076 B2 * | 5/2020 | Lee | B60R 21/232 |
| 10,647,286 B1 * | 5/2020 | Dennis | B60R 21/232 |
| 10,682,974 B2 * | 6/2020 | Thomas | B60R 21/232 |

(Continued)

FOREIGN PATENT DOCUMENTS

KR 101510656 B1 * 4/2015

OTHER PUBLICATIONS

KR-101510656-B1 (machine translation) (Year: 2015).*

Primary Examiner — Karen Beck
Assistant Examiner — Joselynn Y Sliteris
(74) Attorney, Agent, or Firm — Frank A. MacKenzie; Bejin Bieneman PLC

(57) ABSTRACT

An assembly includes a roof rail. The assembly includes a vehicle seat having a seatback. The assembly includes an airbag supported by the roof rail. The airbag is inflatable vehicle-inboard from the roof rail to an inflated position. The airbag surrounds the seatback when the airbag is in the inflated position.

14 Claims, 5 Drawing Sheets

(56) References Cited

U.S. PATENT DOCUMENTS

| | | | |
|---|---|---|---|
| 10,730,470 B2 | 8/2020 | Choi | |
| 10,836,340 B2 * | 11/2020 | Obayashi | B60R 21/2338 |
| 10,864,882 B2 * | 12/2020 | Obayashi | B60R 21/214 |
| 10,899,306 B2 * | 1/2021 | Deng | B60R 21/2338 |
| 11,135,992 B2 * | 10/2021 | Faruque | B60R 21/214 |
| 11,186,246 B2 * | 11/2021 | Min | B60R 21/232 |
| 11,390,235 B2 * | 7/2022 | Kim | B60R 21/2338 |
| 11,479,203 B2 * | 10/2022 | Jayakar | G02B 13/06 |
| 2019/0241141 A1 | 8/2019 | Sirous | |
| 2020/0139924 A1 | 5/2020 | Naranjo | |
| 2021/0061214 A1 * | 3/2021 | Kim | B60R 21/237 |
| 2022/0017036 A1 * | 1/2022 | Jeong | B60R 21/214 |
| 2023/0097595 A1 * | 3/2023 | Fischer | B60R 21/2338 |
| | | | 280/730.2 |

\* cited by examiner

AIRBAG SURROUNDING SEATBACK OF VEHICLE SEAT

BACKGROUND

Vehicles are equipped with airbags. In the event of an impact, an inflator activates and provides inflation medium to the airbags, and the airbags pressurize and act as supplemental restraints for occupants during the impact. The airbags are located at various fixed positions in passenger cabins of vehicles. Vehicles typically include a driver airbag mounted in the steering wheel, a passenger airbag mounted in the dashboard in a vehicle-forward direction from the front passenger seat, and side air curtains mounted in the roof rails.

DETAILED DESCRIPTION

Figure 1:
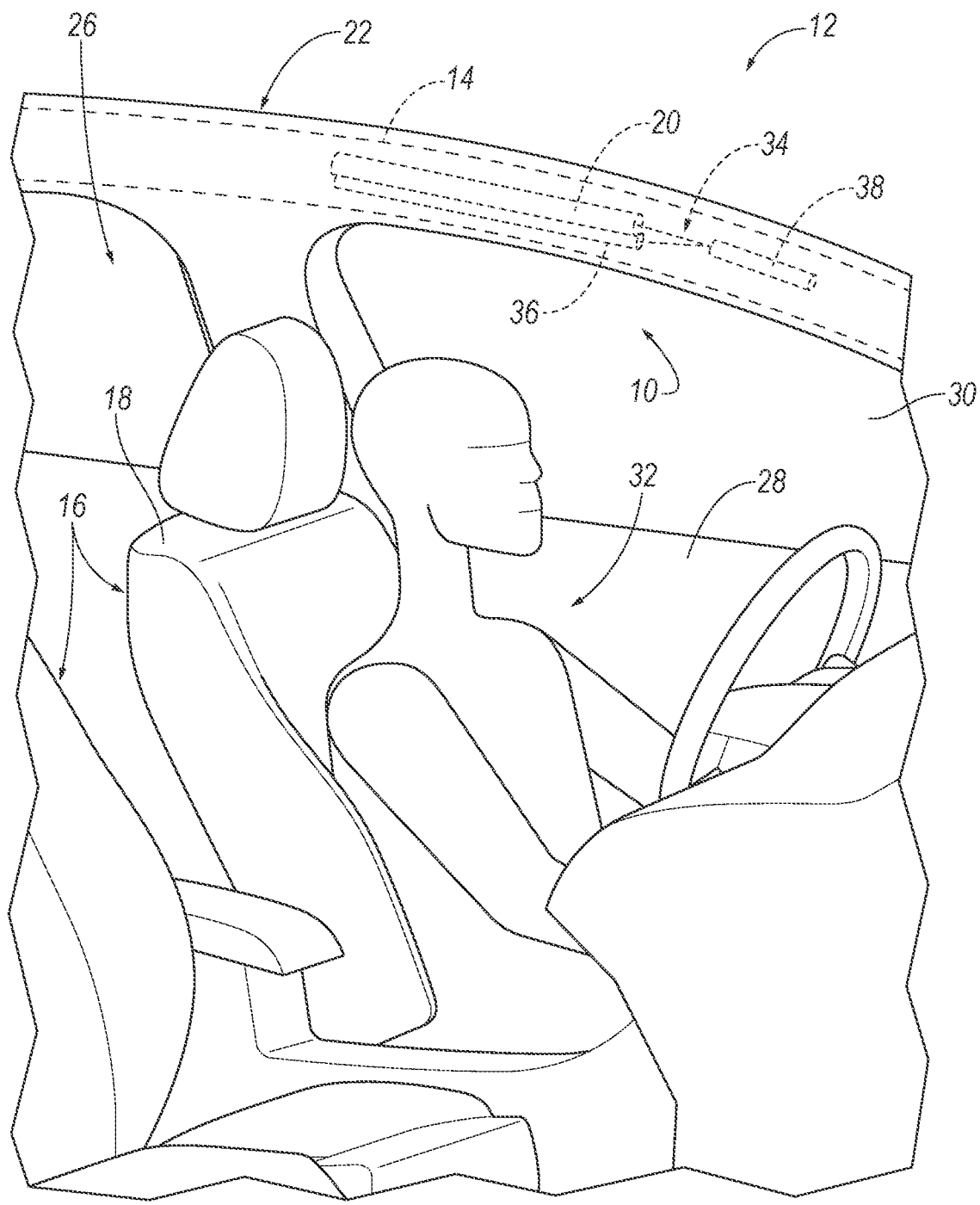
FIG. 1 is a perspective view of a vehicle having an airbag assembly having an airbag and a second airbag, each in an uninflated position.

An assembly includes a roof rail. The assembly includes a vehicle seat having a seatback. The assembly includes an airbag supported by the roof rail, the airbag being inflatable vehicle-inboard from the roof rail to an inflated position. The airbag surrounding the seatback when the airbag is in the inflated position.

The assembly may include a second airbag supported by the roof rail vehicle-outboard of the vehicle seat. The second airbag may be inflatable downwardly from the roof rail to an inflated position adjacent the vehicle seat.

The assembly may include a tether elongated from the airbag to the second airbag, the tether being seat-rearward of the seatback.

The assembly a tether elongated from the airbag to the second airbag, the tether being seat-forward of the seatback.

The assembly a second tether elongated from the airbag to the second airbag. The second tether may be seat-rearward of the seatback and the seatback being between the tether and the first tether.

The seatback may define an occupant seating area between the tether and the second tether.

The occupant seating area may be between the second tether and the seatback.

The assembly may include a vehicle door adjacent the vehicle seat. The second airbag may be inflatable between the vehicle door and the vehicle seat.

The second airbag is vehicle-outboard of the airbag in the inflated position.

The assembly may include an inflator fluidly coupled to the airbag and the second airbag.

The assembly may include a roof supported by the roof rail. The airbag may be between the seatback and the roof in the inflated position.

The seatback defines an occupant seating area. The airbag may be between the occupant seating area and the roof.

The seatback may define an occupant seating area, the airbag surrounding the occupant seating area in the inflated position.

The occupant seating area may be between the airbag and the seatback when the airbag is in the inflated position.

The seatback may be between the occupant seating area and the airbag.

The airbag may abut the seatback in the inflated position.

The assembly may include a second vehicle seat. The airbag may be between the vehicle seat and the second vehicle seat in the inflated position.

With reference to the Figures, wherein like numerals indicate like parts throughout the several views, an assembly 10 for a vehicle 12 includes a roof rail 14. The assembly 10 includes a vehicle seat 16 having a seatback 18. The assembly 10 includes an airbag 20 supported by the roof rail 14. The airbag 20 is inflatable vehicle-inboard from the roof rail 14 to an inflated position. The airbag 20 surrounds the seatback 18 when the airbag 20 is in the inflated position.

In the event of an impact to the vehicle 12, the airbag 20 is inflated to the inflated position. The airbag 20 surrounds the seatback 18 of the seat 16 to control the kinematics of an occupant seated in the seat 16. The airbag 20 limits contact between the occupant and other occupants of the vehicle 12 and between the occupant and other components of the vehicle 12, e.g., a steering wheel or instrument panel. The airbag 20 surround the seat 16 may control the kinematics of the occupant of the seat 16 in the event of a vehicle impact in examples where the seat 16 may be rotatable. For example, the airbag 20 may surround the seatback 18 if the seat 16 is forward-facing or if the seat 16 is rearward-facing.

Figure 2:
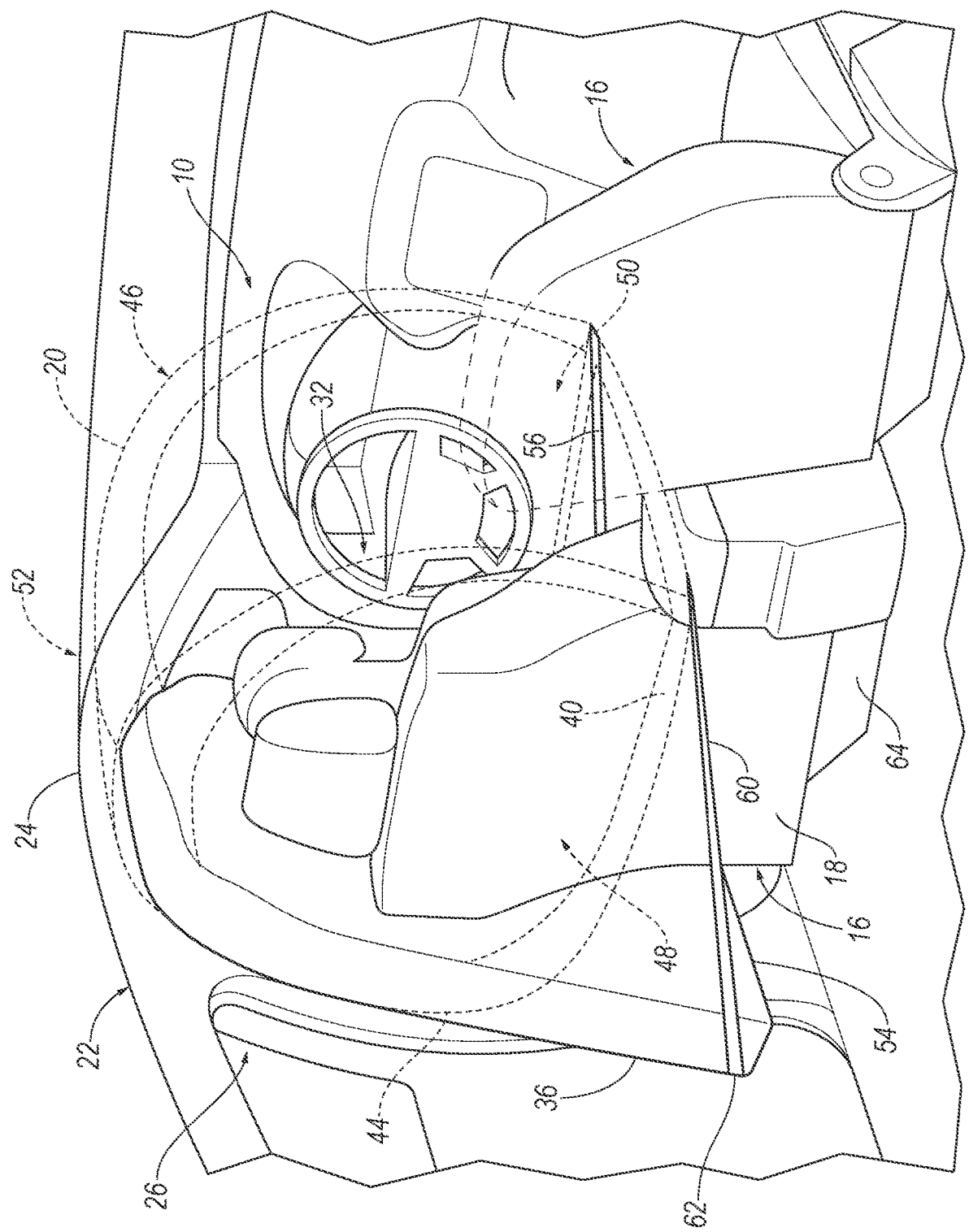
FIG. 2 is a rear perspective view of the vehicle having the airbag assembly having the airbag and the second airbag, each airbag in an inflated position.
Figure 3:
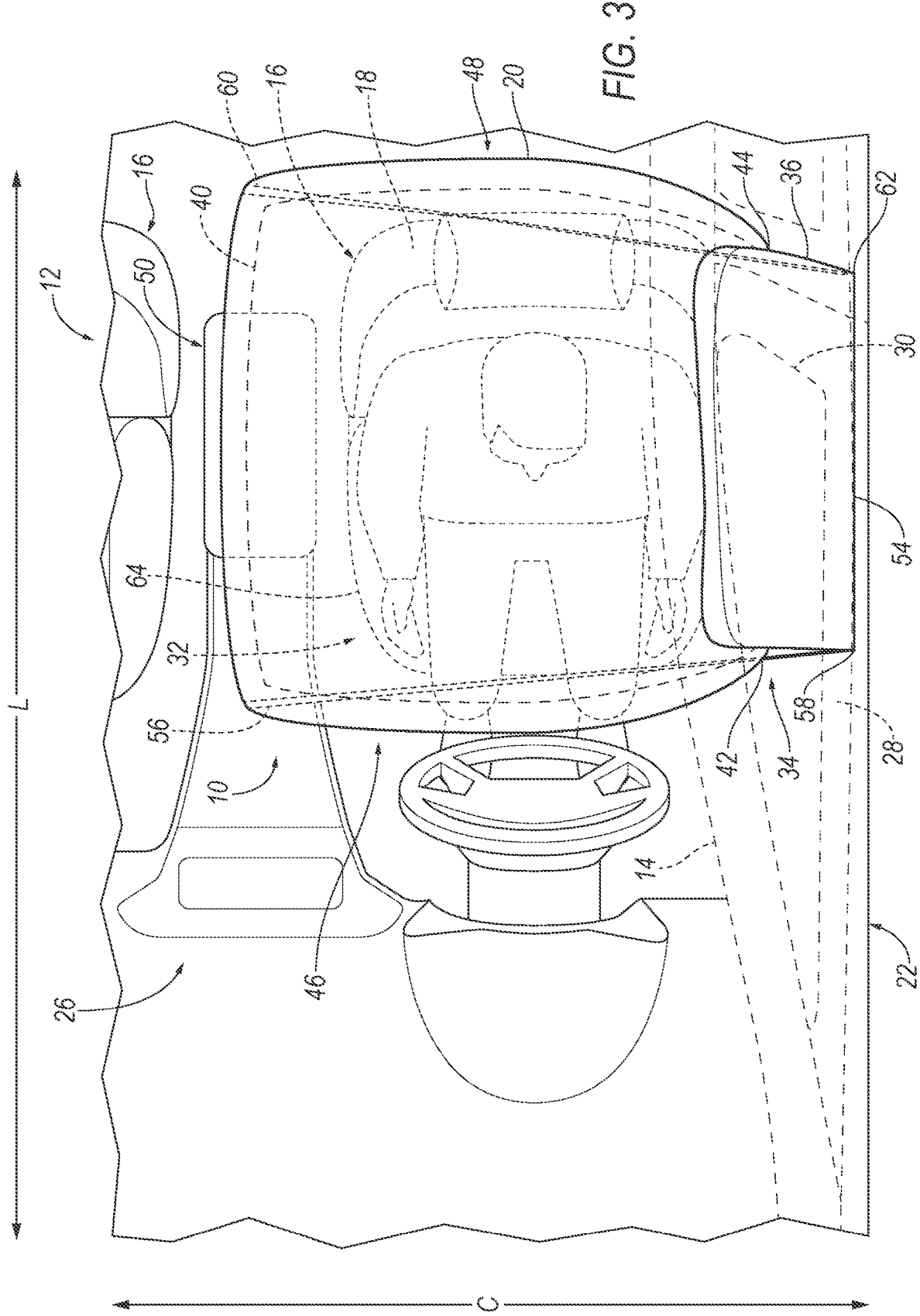
FIG. 3 is a plan view of the vehicle with the airbag and the second airbag in the inflated position.

With reference to FIGS. 1-3, the vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous. In other words, the vehicle 12 may be autonomously operated such that the vehicle 12 may be driven without constant attention from a driver, i.e., the vehicle 12 may be self-driving without human input.

The vehicle 12 includes a vehicle body 22. The vehicle body 22 may be of a unibody construction. In the unibody construction, the vehicle body 22, e.g., rockers, serves as a frame, and the vehicle body 22 (including the rockers, pillars, roof rails 14, etc.) is unitary, i.e., a continuous one-piece unit. As another example, the vehicle body 22 and frame may have a body-on-frame construction (also referred to as a cab-on-frame construction). In other words, the vehicle body 22 and frame are separate components, i.e., are modular, and the vehicle body 22 is supported on and affixed to the frame. Alternatively, the vehicle body 22 may have any suitable construction. The vehicle body 22 may be formed of any suitable material, for example, steel, aluminum, etc.

The vehicle body 22 includes body panels (not numbered) partially defining an exterior of the vehicle 12. The body panels may present a class-A surface at the exterior of the vehicle 12, e.g., a finished surface exposed to view by a customer and free of unaesthetic blemishes and defects. The body panels include, e.g., a roof 24, etc.

With reference to FIGS. 1 and 2, the vehicle 12 includes a pair of roof rails 14. Specifically, the vehicle body 22 includes the roof rails 14. The roof rails 14 are spaced from one another in a cross-vehicle direction C. The roof rails 14 each extend longitudinally along the vehicle body 22, i.e., along a longitudinal axis of the vehicle body 22. The first of the roof rails 14 may extend along the passenger side of the passenger compartment 26 and the second of the roof rails 14 may extend along the driver side of the passenger compartment 26.

The roof 24 may be supported by the roof rails 14 and extend from the front end of the passenger compartment 26 to the rear end of the passenger compartment 26 and from one roof rail 14 to the other roof rail 14. The roof 24 may present a class-A surface facing the passenger compartment 26, i.e., a surface specifically manufactured to have a high quality, finished, aesthetic appearance free of blemishes. The roof 24 may be or include at least one panel.

The vehicle body 22 defines a passenger compartment 26 to house occupants, if any, of the vehicle 12. The passenger compartment 26 may extend across the vehicle 12, i.e., from one side to the other side of the vehicle 12. The passenger compartment 26 includes a front end and a rear end with the front end being in front of the rear end during forward movement of the vehicle 12. The passenger compartment 26 includes a passenger side and a driver side. The passenger side may be on the right side of the passenger compartment 26 during forward movement of the vehicle 12. The driver side may be on the left side of the passenger compartment 26 during forward movement of the vehicle 12.

The vehicle 12 may include a headliner (not numbered) supported by the vehicle body 22. The headliner may be mounted adjacent the roof 24 at a top portion of the passenger compartment 26. The headliner may conceal the roof 24 from inside the passenger compartment 26. The headliner may present a class-A surface facing the passenger compartment 26, i.e., a surface specifically manufactured to have a high quality, finished, aesthetic appearance free of blemishes.

With continued reference to FIGS. 1 and 2, the vehicle 12 includes doors 28 openable for occupants to enter and exit a passenger cabin. The roof rails 14 contact a top edge of the doors 28. The door 28 includes a window opening (not numbered), an opening completely closed by a window 30 if the window 30 is in a fully raised position. The window opening is defined by a door trim and a door panel on a bottom edge and either by the door 28 circumscribing the window opening or by the vehicle body 22, e.g., the A pillar, the B pillar, and the roof rail 14.

The vehicle 12 includes the seat 16 adjacent one of the doors 28. The vehicle 12 may include any suitable number of seats 16 and the seats 16 may be arranged in any suitable arrangement in the passenger compartment 26. As in the example shown in the Figures, one or more of the seats 16 may be at the front end of the passenger compartment 26, e.g., a driver seat 16 and/or a passenger seat 16. In other examples, one or more of the seats 16 may be behind the front end of the passenger compartment 26, e.g., at the rear end of the passenger compartment 26. The seat 16 may be movable relative to the floor to various positions, e.g., movable fore-and-aft and/or cross-vehicle. The seat 16 may be of any suitable type, e.g., a bucket seat.

The seat 16 includes the seatback 18 and a seat bottom 64. The seatback 18 may be supported by the seat bottom 64 and may be stationary or movable relative to the seat bottom 64. The seatback 18 and the seat bottom 64 may be adjustable in multiple degrees of freedom. Specifically, the seatback 18 and the seat bottom 64 may themselves be adjustable, in other words, adjustable components within the seatback 18 and/or the seat bottom 64, and/or may be adjustable relative to each other.

The seat 16 may include a seat frame (not shown) and a covering (not numbered) supported on the seat frame. The seat frame may include tubes, beams, etc.

The seat frame may be of any suitable plastic material, e.g., carbon fiber reinforced plastic CFRP, glass fiber-reinforced semi-finished thermoplastic composite organosheet, etc. As another example, some or all components of the seat frame may be formed of a suitable metal, e.g., steel, aluminum, etc. The covering may include upholstery and padding. The upholstery may be cloth, leather, faux leather, or any other suitable material. The upholstery may be stitched in panels around the frame. The padding may be between the covering and the seat frame and may be foam or any other suitable material.

The seatback 18 and the seat bottom 64 define an occupant seating area 32 of the seat 16. The occupant seating area 32 is the area occupied by an occupant when properly seated on the seat bottom 64 and the seatback 18. The occupant seating area 32 is in a seat-forward direction of the seatback 18 and above the seat bottom 64. The occupant seating area 32 faces the front end of the passenger compartment 26 when the seat 16 is in a forward-facing position and the occupant seating area 32 faces the rear end of the passenger compartment 26 when the seat 16 is in a rearward-facing position.

Each seat 16 may rotate about an axis (not numbered) that extends through the roof 24 and the vehicle floor. For example, the seats 16 may rotate between a forward-facing position and a rearward-facing position. In the forward-facing position, an occupant of the seat 16 faces the front end of the passenger compartment 26. In the rearward-facing position, an occupant of the seat 16 faces the rear end of the passenger compartment 26. The seats 16 may rotate completely, i.e., 360°, about the axis. The seats 16 may rotate between fixed positions, e.g., the forward-facing position and the rearward-facing position, or may be rotatable to an infinite number of positions.

With reference to FIGS. 1-5, the vehicle 12 may include an airbag assembly 34 supported by the vehicle body 22. Specifically, the airbag assembly 34 may be supported by one of the roof rails 14. The airbag assembly 34 may be mounted to the roof rail 14, e.g., by fasteners, clips, etc. The airbag assembly 34 may be supported by the roof rails 14 adjacent a seat 16 in the passenger compartment 26. As in the example shown in the Figures, the airbag assembly 34 may be supported by the roof rail 14 adjacent the driver seat 16. In other examples, the airbag assembly 34 may be supported by the roof rail 14 adjacent any other seat 16 of the vehicle 12, e.g., the passenger seat 16, a rear seat 16, etc. The vehicle 12 may include any suitable number of airbag assemblies 34. The vehicle 12 may include multiple airbag assemblies 34 supported along the roof rails 14 on each side of the vehicle 12, e.g., adjacent each of the seats 16 of the vehicle 12 adjacent the roof rail 14. In such examples, the airbag assemblies 34 may be spaced along a vehicle-longitudinal axis L and along the roof rails 14. In examples including more than one airbag assembly 34, the airbag assemblies 34 may be identical or substantially identical to each other.

The airbag assembly 34 includes the airbag 20, a second airbag 36, an inflator 38, and may include a housing (not shown). The airbag 20 and the inflator 38 are supported by the roof rail 14 of the vehicle 12. The airbag 20 inflates from an uninflated position to the inflated position. In the uninflated position, the airbag 20 may be wrapped and elongated along the roof rail 14 adjacent a seat 16 of the vehicle 12. In the example shown in the Figures and as discussed above, the airbag 20 is adjacent the driver seat 16. The airbag 20 may be adjacent any suitable seat 16 of the vehicle 12.

The airbag 20 is inflatable vehicle-inboard from the roof rail 14 to the inflated position. In other words, the airbag 20 may inflated away from the roof rail 14 and toward the center of the vehicle 12. For example, the airbag 20 may inflated vehicle-inboard in the cross-vehicle direction C to a bottom end 40. The airbag 20 may inflate toward a second seat 16, for example, the passenger seat 16 in the example shown in the Figures. The bottom end 40 of the airbag 20 may move away from the roof rail 14 and toward the second seat 16, i.e., the passenger seat 16. In examples as shown in the Figures, i.e., examples where the airbag 20 is adjacent a front row seat or a bucket seat, the airbag 20, specifically, the bottom end 40 of the airbag 20, may be between the seat 16 and the second seat 16 in the inflated position. Specifically as shown in the Figures, the bottom end 40 of the airbag 20 is between the driver seat 16 and the passenger seat 16.

With reference to FIGS. 2 and 3, in the inflated position, the airbag 20 surrounds the occupant in the event of a vehicle impact to the vehicle 12. In the event of a vehicle impact, the airbag 20 may move toward the inflated position. The airbag 20 may control the kinematics of the occupant in the event of an impact to the vehicle 12. Surrounding the occupant may limit interaction between the occupant and other occupants of the vehicle 12 and between the occupant and other components of the vehicle 12, e.g., a steering wheel or instrument panel. The airbag 20 may surround the seat 16 in examples where the seat 16 is rotatable. For example, if the seat 16 is forward-facing, such as is shown in the Figures, the airbag 20 surrounds the occupant in the inflated position. In other examples, such as when the seat 16 is rearward-facing, the airbag 20 surrounds the occupant in the inflated position.

To surround the occupant in the inflated position, the airbag 20 surrounds the seat 16. Specifically, the airbag 20 surrounds the seatback 18 of the seat 16 when the airbag 20 is in the inflated position. In the inflated position, the airbag 20 may extend from the roof rail 14 above and around the seat 16 to surround the seat 16. In the inflated position, the seatback 18 is between a portion of the airbag 20 and the occupant seating area 32 and the airbag extends from the seatback 18 around the occupant seating area 32. For example, in the example shown in the Figures in which the seat 16 is forward-facing, the airbag 20 extends vehicle-rearward of the seatback 18 and vehicle-forward of the occupant seating area 32. The bottom end 40 extends around the seat 16.

In the example shown in the Figures, the airbag 20, when surrounding the occupant, may be above the seat bottom 64 of the seat 16. The airbag 20 may extend from the roof rail 14 surrounding the seatback 18 and extend downwardly to the seat bottom 64. Specifically, in some examples such as shown in the Figures, the airbag 20 may contact the legs of the occupant and/or the top of the seat bottom 64 when the airbag 20 is in the inflated position.

The airbag 20 includes a first end 42 and a second end 44. Specifically, the bottom end 40 extends from the first end 42 to the second end 44. The first end 42 and the second end 44 are spaced from each other along the vehicle-longitudinal axis L and are adjacent the door 28. The first and second end 44 may be between the door 28 and the seat 16 when the airbag 20 is in the inflated position. The bottom end 40 extends from the first end 42 adjacent the door 28. The airbag 20 may be arc-shaped from the first end 42 to the second end 44, in an arc around the seat 16 to the second end 44 adjacent the door 28.

The airbag 20 may include a vehicle-forward portion 46, a vehicle-rearward portion 48, an inboard-side portion 50, and a seat-upward portion 52. The vehicle-forward portion 46, the vehicle-rearward portion 48, the inboard-side portion 50, and the seat-upward portion 52 are fluidly connected with each other. Specifically, the airbag 20 may define an inflation chamber (not numbered) that extends through all of the portions 46, 48, 50, 52 of the airbag 20. In other words, the portions 46, 48, 50, 52 are inflated together by the same inflator 38.

The vehicle-forward portion 46 may be elongated generally cross-vehicle at a position vehicle-forward of the seat 16, i.e., vehicle-forward of the seatback 18. The vehicle-rearward portion 48 may be vehicle-rearward of the seat 16. Specifically, the vehicle-rearward portion 48 may be vehicle-rearward of the seatback 18 of the seat 16. The vehicle-rearward portion 48 may be elongated generally cross-vehicle at a position vehicle-rearward of the seat 16. The vehicle-rearward portion 48 is spaced along the seat bottom 64 from the vehicle-forward portion 46.

The inboard-side portion 50 may be adjacent a side of the seat 16. In the example shown in the Figures, the inboard-side portion 50 is to the right of the seat 16 and between the driver seat 16 and the passenger seat 16 of the vehicle 12. In other examples, such as when the seat 16 is rearward-facing, the inboard-side portion 50 may be to the left of the seat 16 and between the driver seat 16 and the passenger seat 16. The seat-upward portion 52 may be upward of the seat 16. Specifically, the seat-upward portion 52 may be upward of the seatback 18. The vehicle-forward portion 46 may be elongated from the first end 42 to the inboard-side portion 50 and the vehicle-rearward portion 48 may be elongated from the second end 44 to the inboard-side portion 50.

The airbag 20 is between the seat 16 and the roof 24 of the vehicle 12 when the airbag 20 is in the inflated position. Specifically, the airbag 20 is between the seatback 18 and the roof 24 in the inflated position. The seat-upward portion 52 is between the seatback 18 and the roof 24. The airbag 20 surrounds the occupant seating area 32 when the airbag 20 is in the inflated position. The airbag 20 may be between the occupant seating area 32 and the roof 24 of the vehicle 12. The airbag 20 may be upward of the seatback 18 of the seat 16. Specifically, the airbags 20 is upward of the occupant seating area 32 between the occupant seating area 32 and the roof 24. In other words, the seat-upward portion 52 of the airbag 20 may be between the seat 16, i.e., the occupant seating area 32, and the roof 24. In the inflated position, the seatback 18 is between the occupant seating area 32 and the airbag 20. Specifically, seatback 18 is between the occupant seating area 32 and the vehicle-rearward portion 48 of the airbag 20. The occupant seating area 32 is between the seatback 18 and the airbag 20. Specifically, the occupant seating area 32 is between the seatback 18 and the vehicle-forward portion 46 of the airbag 20. The airbag 20 extend both vehicle-forward and vehicle-rearward of both the seatback 18 and the occupant seating area 32.

With reference to FIG. 3, the airbag 20 may abut the seatback 18 when the airbag 20 is in the inflated position. Specifically, the vehicle-rearward portion 48 may abut the seatback 18 of the seat 16. The airbag 20 may abut the seatback 18 on a seat-rearward side of the seatback 18. In the example shown in the Figures, the airbag 20 abuts the seatback 18 on a side of the seatback 18 facing the rear seats 16 of the vehicle 12. In other examples, such as examples where the seat 16 may rotate to the rearward-facing position, the airbag 20 may abut the seatback 18 on a side of the seatback 18 that is facing forward in the vehicle 12, i.e., a side facing the direction of travel of the vehicle 12. In all examples, the vehicle-rearward portion 48 abuts the seatback 18 on a seat-reward side of the seatback 18 in the inflated position.

The airbag assembly 34 may include the second airbag 36 inflatable from an uninflated position to an inflated position. The second airbag 36 is supported by the vehicle body 22. Specifically, the second airbag 36 is supported by the roof rail 14 adjacent the airbag 20 in both the uninflated position and the inflated position. The second airbag 36 is supported by the roof rail 14 vehicle-outboard of the seat 16 adjacent the roof rail 14. The second airbag 36 may be mounted to the roof rail 14, e.g., by fasteners, clips, etc.

As the second airbag 36 moves from the uninflated position to the inflated position, the second airbag 36 is inflatable downwardly from the roof rail 14. The second airbag 36 is adjacent the door 28 and the window 30 when the second airbag 36 is in the inflated position. The second airbag 36 is inflatable downwardly from the roof rail 14 to a distal end 54 spaced downwardly from the roof rail 14. The second airbag 36 defines an inflation chamber (not numbered) extending from the roof rail 14 to the distal end 54. In the inflated position, the second airbag 36 is adjacent the seat 16. The second airbag 36 is inflatable between the door 28 and the seat 16. Specifically, in the inflated position, the distal end 54 of the second airbag 36 is between the door 28 and the seat 16. The second airbag 36 may be between the occupant seating area 32 of the seat 16 and the door 28. The second airbag 36 may control the kinematics of the occupant of the seat 16 in the event of an impact to the vehicle 12.

As discussed above, the second airbag 36 is adjacent the airbag 20 in the uninflated position and the inflated position. The second airbag 36 may extend along the roof rail 14 adjacent the airbag 20 in the uninflated position and the inflated position. The second airbag 36 may extend along the seat-upward portion 52 of the airbag 20. The second airbag 36 may be elongated between the vehicle-forward portion 46 and the vehicle-rearward portion 48 and along the seat-upward portion 52 of the airbag 20. Specifically, the second airbag 36 may extend along the vehicle-longitudinal axis L between the first end 42 and the second end 44 of the airbag 20. The second airbag 36 may extend from the first end 42 to the second of the airbag 20 in the inflated position.

The second airbag 36 may be between the airbag 20 and the door 28 in the inflated position. The second airbag 36 is vehicle-outboard of the airbag 20 in the inflated position. The second airbag 36 may be spaced cross-vehicle from the inboard-side portion 50 of the airbag 20. Specifically, the second airbag 36 may be spaced vehicle-outboard of the inboard-side portion 50 of the airbag 20.

Figure 4:
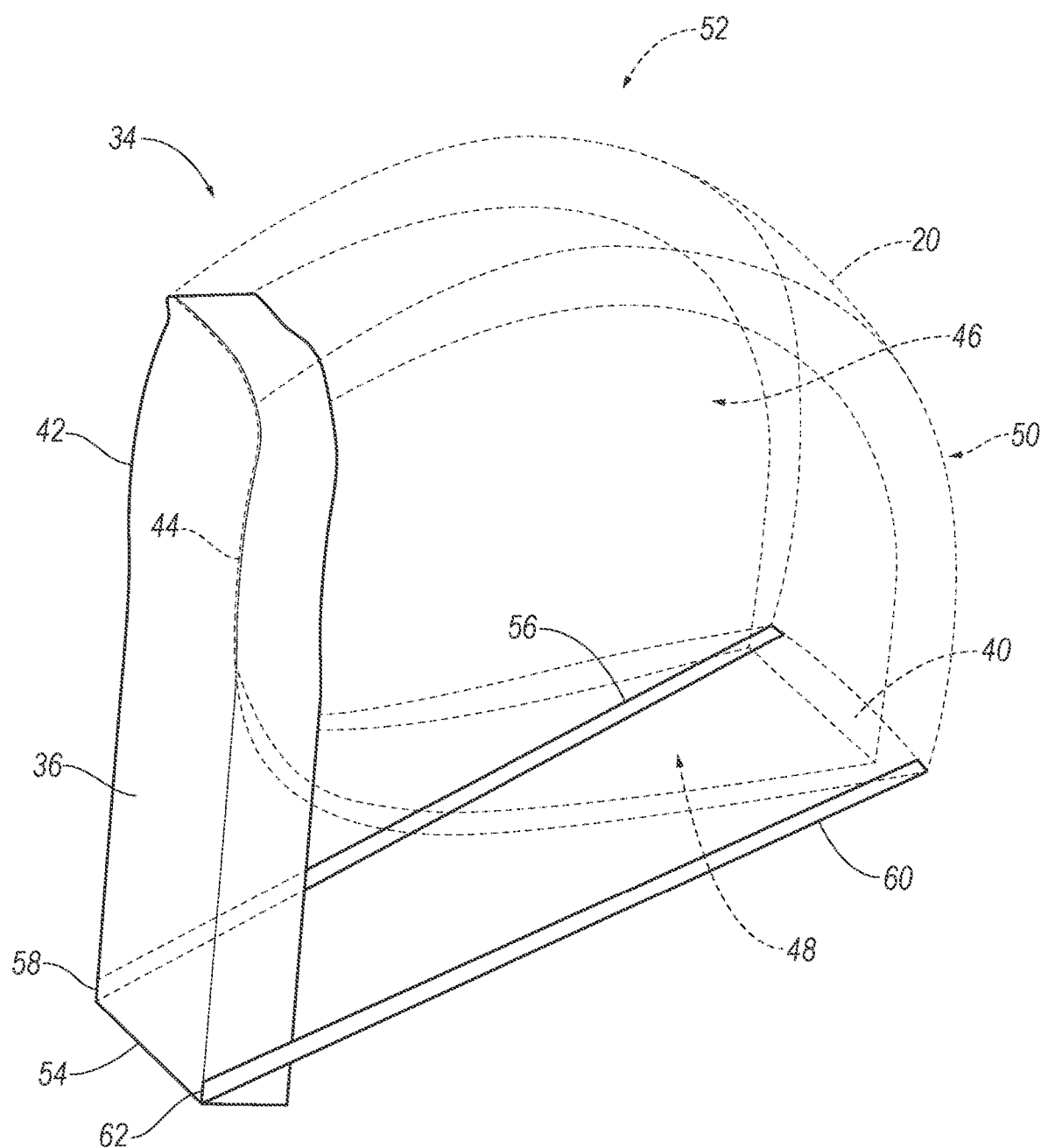
FIG. 4 is a perspective view of the airbag and the second airbag having tethers extending from the airbag to the second airbag.
Figure 5:
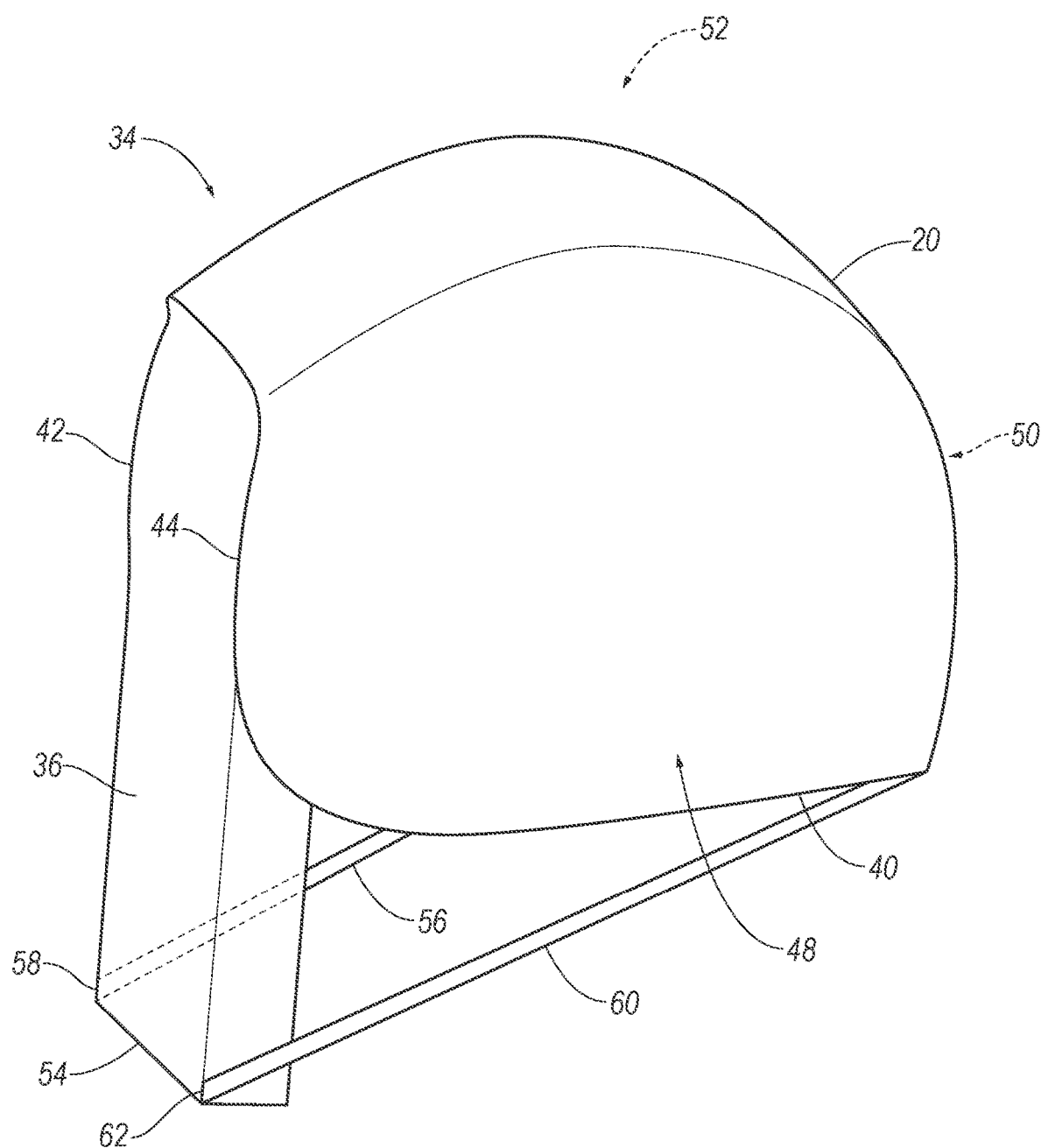
FIG. 5 is a perspective view of the airbag and the second airbag.

With reference to FIGS. 3, 4, and 5, the assembly 10 includes at least one tether 56, 60. In the example shown in the Figures, the assembly 10 includes two tethers 56, 60. Specifically, the example shown in the Figures includes a first tether 56 and a second tether 60. The assembly 10 may include any suitable number of tethers 56, 60. The tethers 56, 60 are external to the airbags 20, 36. In other words, the tethers 56, 60 are not in communication with the inflation chambers of the airbags 20, 36 and the tethers 56, 60 are external to the inflation chambers of the airbags 20, 36. In some examples, such as in the example shown in the Figures, the tethers 56, 60 are uninflatable. In other words, the tethers 56, 60 is separated from any inflation chamber of the airbag 20, 36 and does not include a chamber inflatable by inflation medium.

The first tether 56 is elongated between the airbag 20 and the second airbag 36 in the inflated positions. The first tether 56 may be elongated from the airbag 20 to the second airbag 36. Specifically, the first tether 56 may be elongated from a vehicle-forward point 58 of the distal end 54 to a portion of the bottom end 40 of the airbag 20 that is between the vehicle-forward portion 46 and inboard-side portion 50 of the airbag 20. The first tether 56 may be seat-forward of the seat 16. Specifically, the first tether 56 may be seat-forward of the seatback 18. The occupant seating area 32 may be between the first tether 56 and the seatback 18 when the airbag 20 and the second airbag 36 are in the inflated position. In other words, the first tether 56 may be elongated seat-forward of the occupant. As the airbag 20 and the second airbag 36 both move toward the inflated position, the first tether 56 may pull the airbag 20 downwardly around the seat 16 and the occupant seating area 32. The first tether 56 may be in tension as the second airbag 36 moves downwardly to pull the airbag 20 around the seat 16.

The second tether 60 is spaced from the first tether 56. The second tether 60 may be elongated between the airbag 20 and the second airbag 36 in the inflated positions. The second tether 60 may be elongated from the airbag 20 to the second airbag 36. Specifically, the second tether 60 may be elongated from a vehicle-rearward point 62 of the distal end 54 to a portion of the bottom end 40 of the airbag 20 that is between the vehicle-rearward portion 48 and the inboard-side portion 50 of the airbag 20. The second tether 60 may be seat-rearward of the seat 16. Specifically, the seatback 18 may be between the occupant seating area 32 and the second tether 60.

As discussed above, the first tether 56 may be seat-forward of the seatback 18 and the second tether 60 may be seat-rearward of the seatback 18. In other words, the assembly 10 may include a tether 56, 60 both seat-forward and seat-rearward of the seatback 18. The occupant seating area 32 may be between the first tether 56 and the second tether 60. The occupant seating area 32 is between the first tether 56 and the seatback 18. In other words, the occupant may be between the first tether 56 and the second tether 60.

As the airbag 20 moves toward the inflated position, the airbag 20 begins to surround the seat 16. Subsequent to the airbag 20 beginning to move toward the inflated position, the second airbag 36 begins to move toward the inflated position. As the second airbag 36 moves toward the inflated, the first tether 56 and the second tether 60 pull the airbag 20 around the seat 16 and maintain the position of the airbag 20 around the seat 16.

The inflator 38 is fluidly coupled with the airbag 20 and the second airbag 36. The inflator 38 expands the airbag 20 and the second airbag 36 with inflation medium, such as a gas, to move the airbag 20 from the uninflated position to the inflated position. In some examples, such as shown in the Figures, the inflator 38 may include a dual fill tube fluidly connected to the airbag 20 and the second airbag 36. In other examples, the assembly 10 may include multiple inflators 38, e.g., a first inflator 38 fluidly connected to the airbag 20 and a second inflator 38 fluidly connected to the second airbag 36. The inflator 38 may be supported by any suitable component. For example, the inflator 38 may be supported by the roof rail 14. The inflator 38 may be, for example, a pyrotechnic inflator 38 that ignites a chemical reaction to generate the inflation medium, a stored gas inflator that releases e.g., by a pyrotechnic valve stored gas as the inflation medium, or a hybrid. The inflator 38 may be, for example, at least partially in the inflation chamber to deliver inflation medium directly to the inflation chamber or may be connected to the inflation chamber through fill tubes, diffusers, etc.

The vehicle 12 includes a computer (not shown) having a processor and a memory storing instructions executable by the processor to inflate the airbags 20, 36 in the event of a vehicle impact. The computer is programmed to perform the function described herein. Use of "in response to," "based on," and "upon determining" herein indicates a causal relationship, not merely a temporal relationship. The computer may be, for example, a restraints control module. Based on a detected vehicle impact, the restraints control module may activate the inflator 38 to inflate the airbags 20, 36.

The airbag 20, the second airbag 36, and the tethers may be fabric, e.g., a woven polymer. As an example, the airbag 20 may be woven nylon yarn, for example, nylon 6, 6. Other examples of woven polymers include polyether ether ketone PEEK, polyetherketoneketone PEKK, polyester, etc. The woven polymer may include a coating, such as silicone, neoprene, urethane, etc. For example, the coating may be polyorgano siloxane.

The numerical adverbs "first" and "second" are used herein merely as identifiers and do not signify order or importance. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
   a roof rail;
   a vehicle seat having a seatback, the seatback having a top end;
   a first airbag and a second airbag each inflatable to an inflated position;
   the first airbag supported by the roof rail vehicle-outboard of the vehicle seat, the first airbag being inflatable vehicle-inboard from the roof rail in a cross-vehicle direction above the top end of the seatback, the first airbag in the inflated position extending downwardly from above the top end of the seatback to a bottom end of the first airbag, the bottom end of the first airbag being below the top end of the seatback in the inflated position;
   the second airbag supported by the roof rail vehicle-outboard of the vehicle seat, the second airbag being inflatable downwardly from the roof rail to a distal end adjacent the vehicle seat below the top end of the seatback in the inflated position;
   the first airbag surrounding the seatback when the first airbag is in the inflated position;
   a first tether elongated from the distal end to the bottom end in the cross-vehicle direction seat-forward of the seatback; and
   a second tether elongated from the distal end to the bottom end in the cross-vehicle direction seat-rearward of the seatback, the seatback being between the first tether and the second tether.

2. The assembly of claim 1, wherein an occupant seating area is between the first tether and the seatback.

3. The assembly of claim 1, further comprising a vehicle door adjacent the vehicle seat, the second airbag being inflatable between the vehicle door and the vehicle seat.

4. The assembly of claim 1, wherein the second airbag is vehicle-outboard of the first airbag in the inflated position.

5. The assembly of claim 1, further comprising an inflator fluidly coupled to the first airbag and the second airbag.

6. The assembly of claim 1, further comprising a roof supported by the roof rail, the first airbag being between the seatback and the roof in the inflated position.

7. The assembly of claim 6, wherein the seatback defines an occupant seating area, the first airbag being between the occupant seating area and the roof.

8. The assembly of claim 1, wherein the seatback defines an occupant seating area, the first airbag surrounding the occupant seating area in the inflated position.

9. The assembly of claim 8, wherein the occupant seating area is between the first airbag and the seatback when the first airbag is in the inflated position.

10. The assembly of claim 8, wherein the seatback is between the occupant seating area and the first airbag.

11. The assembly of claim 1, wherein the first airbag abuts the seatback in the inflated position.

12. The assembly of claim 1, further comprising a second vehicle seat, the first airbag being between the vehicle seat and the second vehicle seat in the inflated position.

13. The assembly of claim 1, wherein:
   the first airbag includes a vehicle-forward portion, a vehicle-rearward portion spaced from the vehicle-forward portion along a vehicle-longitudinal axis, an inboard-side portion spaced from the roof rail in the cross-vehicle direction, and a seat-upward portion positioned above the top end of the seatback;
   the vehicle-forward portion and the vehicle-rearward portion being elongated in the cross-vehicle direction, the seatback being vehicle-rearward of the vehicle-forward portion and vehicle-forward of the vehicle-rearward portion;
   the inboard-side portion extending along the vehicle-longitudinal axis from the vehicle-forward portion to the vehicle-rearward portion; and
   the seat-upward portion extending along the cross-vehicle direction from the roof rail to the inboard-side portion.

14. The assembly of claim 1, wherein the seatback defines an occupant seating area between the first tether and the second tether.

* * * * *